(12) United States Patent (10) Patent No.: US 8,961,650 B2
Kamikawa et al. (45) Date of Patent: Feb. 24, 2015

(54) PARTIALLY-REDUCED IRON PRODUCING METHOD AND PARTIALLY-REDUCED IRON PRODUCING APPARATUS

(71) Applicant: Mitsubishi-Hitachi Metals Machinery, Inc., Tokyo (JP)

(72) Inventors: Susumu Kamikawa, Hiroshima (JP); Hiroshi Nakajima, Hiroshima (JP); Keiichi Sato, Hiroshima (JP); Khanhson Pham, Hiroshima (JP)

(73) Assignee: Mitsubishi-Hitachi Metals Machinery, Inc., Tokyo (JP)

( * ) Notice: Subject to any disclaimer, the term of this patent is extended or adjusted under 35 U.S.C. 154(b) by 128 days.

(21) Appl. No.: 13/693,581

(22) Filed: Dec. 4, 2012

(65) Prior Publication Data

US 2013/0139647 A1 Jun. 6, 2013

(30) Foreign Application Priority Data

Dec. 5, 2011 (JP) .................................. 2011-265559

(51) Int. Cl.
*C22B 1/02* (2006.01)
*C21B 11/10* (2006.01)
(Continued)

(52) U.S. Cl.
CPC . *C22B 1/02* (2013.01); *C21B 11/10* (2013.01); *F27D 17/002* (2013.01); *C21B 13/0046* (2013.01); *C21B 13/10* (2013.01); *C21B 13/143* (2013.01); *F27B 9/30* (2013.01); *C21C 5/5229* (2013.01); *F27B 9/243* (2013.01); *F27B 2009/3027* (2013.01)

USPC .............. 75/484; 75/10.63; 75/504; 266/156; 266/178; 266/197

(58) Field of Classification Search
CPC .. C21B 13/0046; C21B 13/10; C21B 13/143; C21B 11/10; F21D 17/002; F27B 9/30
USPC .......... 75/504, 10.63, 484; 266/178, 156, 197
See application file for complete search history.

(56) References Cited

U.S. PATENT DOCUMENTS 1,832,731 A * 11/1931 Pardee ............................ 75/484
3,649,244 A * 3/1972 Cunningham ................... 75/756

FOREIGN PATENT DOCUMENTS

| JP | 45-39331 | 12/1970 |
|----|----------|---------|
| JP | 8-9739 B2 | 4/1991 |

(Continued)

*Primary Examiner* — George Wyszomierski
*Assistant Examiner* — Tima M McGuthry Banks
(74) *Attorney, Agent, or Firm* — Birch, Stewart, Kolasch & Birch, LLP

(57) ABSTRACT

A reduction furnace includes a pellet material supplying device forming on a grate an ignition carbon material layer having a predetermined height; an ignition device; and an exhaust gas circulation device supplying an oxygen-containing gas comprising circulated exhaust gas mixed with air, to a packed bed of the pellets heated by a combustion heat of the ignition carbon material layer. A partially-reduced iron is produced by thermally reducing the pellets through a combustion region for the ignition carbon material layer and a heating region, the combustion region formed upstream in a travelling direction of the grate by supplying a gas having a high oxygen concentration, the heating region formed downstream of the combustion region by supplying a gas having a low oxygen concentration.

6 Claims, 3 Drawing Sheets

(51) Int. Cl.
*F27D 17/00* (2006.01)
*C21B 13/00* (2006.01)
*C21B 13/10* (2006.01)
*C21B 13/14* (2006.01)
*F27B 9/30* (2006.01)
*C21C 5/52* (2006.01)
*F27B 9/24* (2006.01)

(56) References Cited

FOREIGN PATENT DOCUMENTS

JP 2005-97645 A 4/2005
WO WO 2007122436 A2 * 11/2007

* cited by examiner

PARTIALLY-REDUCED IRON PRODUCING METHOD AND PARTIALLY-REDUCED IRON PRODUCING APPARATUS

TECHNICAL FIELD

The present invention relates to a partially-reduced iron producing method and a partially-reduced iron producing apparatus for producing a partially-reduced iron by reducing agglomerates containing iron oxides.

BACKGROUND ART

For example, Patent Literature 1 listed below discloses a conventional technique of producing a partially-reduced iron by packing carbon composite pellets on a moving grate and thermally reducing the pellets, the carbon composite pellets not being coated with a carbon material for combustion.

However, the technique described in Patent Literature 1 has the following problems and a partially-reduced iron with a high degree of reduction cannot be obtained.

(1) After being dried, the carbon composite pellets are ignited with a gas torch and air is made to flow therethrough to combust and heat the carbon composite pellets. Accordingly, a portion of a packed bed of the carbon composite pellets on a side into which air flows keeps on combusting and reduction dose not proceed in this portion. Moreover, even if the reduction proceeds, the carbon composite pellets are reoxidized by air and thus the degree of reduction does not improve at all. Moreover, since a high temperature state is maintained, a molten slag is excessively generated and an operation may thereby become difficult in some cases.

(2) The pellets having moved out of a carbonization area is heated by a high-temperature inert gas whose oxygen concentration is equal to 5% or less and metallization proceeds by using a remaining portion of the carbonaceous material. However, the amount of remaining carbon is small and the degree of metallization is low. Moreover, until a lower portion of the packed bed reaches a high temperature, an upper portion of the packed bed is exposed to oxidant gases such as carbon dioxide and water vapor generated from the high-temperature carbonaceous material, causing reoxidation of the upper portion to proceed.

(3) A high-temperature gas in a metallization area where a large amount of heat is required is produced by combusting part of flammable volatile components in the coal which is generated in the carbonization area and CO gas which is generated by the reduction reaction. However, since the amount of flammable components is small with respect to the amount of the entire exhaust gas, a supplementary fuel is additionally required.

In view of the problems above, for example, Patent Literatures 2 and 3 each disclose a conventional technique of producing partially-reduced iron in which pellets formed by mixing and pelletizing a reduction carbon material, a fine iron ore, and a slag-forming flux are added with a carbon material for combustion by coating the pellets with the carbon material for combustion, the carbon material for combustion is ignited, and then the pellets are subject to sintering with air being suctioned downward.

CITATION LIST

Patent Literatures

{Patent Literature 1} Japanese Examined Patent Application Publication No. Sho 45-39331

{Patent Literature 2} Japanese Examined Patent Application Publication No. Hei 8-9739

{Patent Literature 3} Japanese Patent Application Publication No. 2005-97645

SUMMARY OF INVENTION

Technical Problem

However, the conventional methods of producing partially-reduced iron which are described in Patent Literatures 2 and 3 have the following problems. First, since the added carbon material for combustion combusts first, carbon monoxide and the flammable volatile component in coal which are generated from the heated pellets hardly combust and are discharged from the packed bed without being effectively used. Accordingly, the basic unit of consumption of fuel becomes larger and $CO_2$ emissions thereby increase. Moreover, since the carbon material for combustion continues to combust until there is no carbon component left therein, the cooling speed of the pellets is slow and thus exhausted metal iron in the reduced pellets is in contact with air in a high temperature state for a long period. Hence, reoxidation proceeds and the degree of metallization is low.

The present invention has been made to solve the problems described above and an object thereof is to provide a partially-reduced iron producing method and a partially-reduced iron producing apparatus which enable reducing carbon dioxide emissions while suppressing the usage amount of a carbon material for combustion.

Solution to Problem

A partially-reduced iron producing method according to a first aspect of the present invention which solves the aforementioned problems includes the steps of: laying an ignition carbon material to a predetermined height on an endless grate; igniting the ignition carbon material, and then packing raw-material pellets on the ignited ignition carbon material, the raw-material pellets formed by mixing and pelletizing a reduction carbon material and a raw material containing iron oxides; causing a flammable volatile component to be generated from the reduction carbon material in the raw-material pellets and combust, by use of a combustion heat of the ignited ignition carbon material; causing a temperature of the raw-material pellets to further rise by use of a combustion heat of the flammable volatile component, so that a reduction reaction proceeds and a carbon monoxide gas is generated, while causing the raw-material pellets adjacent thereto to be heated by use of the combustion heat, so that a flammable volatile component is generated from the reduction carbon material in the adjacent portions of the raw-material pellets; increasing a concentration of the carbon monoxide gas near the raw-material pellets having the temperature further raised, to a combustion range of the carbon monoxide gas by supplying an oxygen-containing gas to the raw-material pellets having the temperature thereof caused to further rise, so that the carbon monoxide gas combusts and a combustion zone is formed, the oxygen-containing gas made by circulating a remaining portion of the flammable volatile component and the carbon monoxide gas and mixing the remaining portion and the gas with air; and moving the combustion zone sequentially in a bed height direction of a packed bed of the raw-material pellets in a period between the supplying of the raw-material pellets onto the ignition carbon material and discharging thereof, so that the packed bed of the raw-material pellet is thermally reduced and a partially-reduced iron is produced.

A partially-reduced iron producing method according to a second aspect of the present invention which solves the aforementioned problems is the partially-reduced iron producing method according to the first aspect, in which a laying height of the ignition carbon material is higher than 3 mm but is lower than 10 mm.

A partially-reduced iron producing method according to a third aspect of the present invention which solves the aforementioned problems is the partially-reduced iron producing method according to the first aspect, in which the partially-reduced iron thus produced is put into a submerged arc furnace in a hot state together with a reduction carbon material to be subjected to final reduction and melting.

A partially-reduced iron producing apparatus according to a fourth aspect of the present invention which solves the aforementioned problems includes a partial reduction furnace configured to pack, on an endless grate, raw-material pellets formed by mixing and pelletizing a reduction carbon material and a raw material containing iron oxides and to thermally reduce the raw-material pellets, the partial reduction furnace including: ignition carbon material supply means for forming an ignition carbon material layer having a predetermined height; ignition means for igniting the ignition carbon material layer; and exhaust gas circulation means for supplying an oxygen-containing gas to a packed bed of the raw-material pellets heated by a combustion heat of the ignited ignition carbon material layer, the oxygen-containing gas made by circulating part of an exhaust gas discharged from the packed bed of the raw-material pellets and mixing the part with air. In the apparatus, a partially-reduced iron is produced by thermally reducing the packed bed of the raw-material pellets through a combustion region for the ignition carbon material layer and a heating region for the raw-material pellets, the combustion region formed on an upstream side in a travelling direction of the endless grate by supplying the oxygen-containing gas having a high oxygen concentration to the ignition carbon material layer ignited by the ignition means, the heating region formed downstream of the combustion region for the ignition carbon material layer in the travelling direction of the endless grate by supplying the oxygen-containing gas having a low oxygen concentration to the packed bed of the raw-material pellets.

A partially-reduced iron producing apparatus according to a fifth aspect of the present invention which solves the aforementioned problems is the partially-reduced iron producing apparatus according to the fourth aspect. The apparatus further includes a hood provided above the endless grate and configured to form an air-tight space between the hood and the endless grate; and a plurality of wind boxes provided below the endless grate and configured to form air-tight spaces between the wind boxes and the endless grate. In the apparatus, the ignition carbon material supply means is disposed upstream of the raw-material pellet supply means in the travelling direction of the endless grate.

A partially-reduced iron producing apparatus according to a sixth aspect of the present invention which solves the aforementioned problems is the partially-reduced iron producing apparatus according to the fifth aspect. The apparatus further includes partition boards provided in the hood, surrounded by the hood and the endless grate, and configured to define a space in a center portion in a longitudinal direction of the endless grate; exhaust gas circulation means for discharging an exhaust gas in the space in the center portion in the longitudinal direction of the endless grate and supplying the exhaust gas to the wind boxes; air supply means, connected to the exhaust gas circulation means, for supplying air; and flow rate adjustment means, provided in the air supply means, for adjusting a flow rate of the air.

Advantageous Effects of Invention

In the present invention, the packed bed of raw-material pellets is heated by the combustion heat of the ignition carbon material. The flammable volatile component is thus generated from the reduction carbon material in the raw-material pellets and combusts. By the combustion of the flammable volatile component, the temperature of the raw-material pellets further rises. Accordingly, a reduction reaction proceeds and a carbon monoxide gas is produced. Meanwhile, the raw-material pellets adjacent to the heated pellets are heated and the flammable volatile component is generated from the reduction carbon material in the adjacent raw-material pellets. An oxygen-containing gas made by circulating a remaining portion of the flammable volatile component and the carbon monoxide gas and mixing them with air is supplied to the raw-material pellets whose temperature has further risen, and the concentration of the carbon monoxide gas near the raw-material pellets is thereby increased to the combustion range of the carbon monoxide gas. Hence, the carbon monoxide gas combusts and the temperature increases. The combustion zone of a temperature required for the reduction of iron is thus formed. The combustion zone sequentially moves in a bed height direction of the packed bed of the raw-material pellets, in a period between the supplying of the raw-material pellets onto the ignition carbon material and discharging thereof. Thus, the packed bed of the raw-material pellets is thermally reduced and the partially-reduced iron is produced. Accordingly, no coating of carbon material to be a heat source is required for the raw-material pellets. As a result, the amount of coal used in the entire partially-reduced iron producing process (apparatus) can be reduced. This reduces the carbon material consumption and the carbon dioxide emissions. Moreover, when the reduction ends, the generation of carbon monoxide gas stops and the concentration of carbon monoxide gas in the atmosphere falls abruptly. The combustion of the carbon monoxide gas stops as soon as the concentration of carbon monoxide falls below the combustion range of carbon monoxide, so that the raw-material pellets are cooled. Hence, the time in which the pellets are in contact with oxygen in a high temperature state is short, suppressing the reoxidation. Thus, a partially-reduced iron with high degree of metallization can be produced.

BRIEF DESCRIPTION OF DRAWINGS

FIG. 2A shows a cross section of a reduction furnace included in the partially-reduced iron producing apparatus. FIG. 2B shows a relationship between an oxygen concentration in the reduction furnace and a bed height direction of a packed bed of raw-material pellets.

DESCRIPTION OF EMBODIMENTS

Descriptions are given below of a mode for carrying out a partially-reduced iron producing method and a partially-reduced iron producing apparatus of the present invention.

Figure 1:
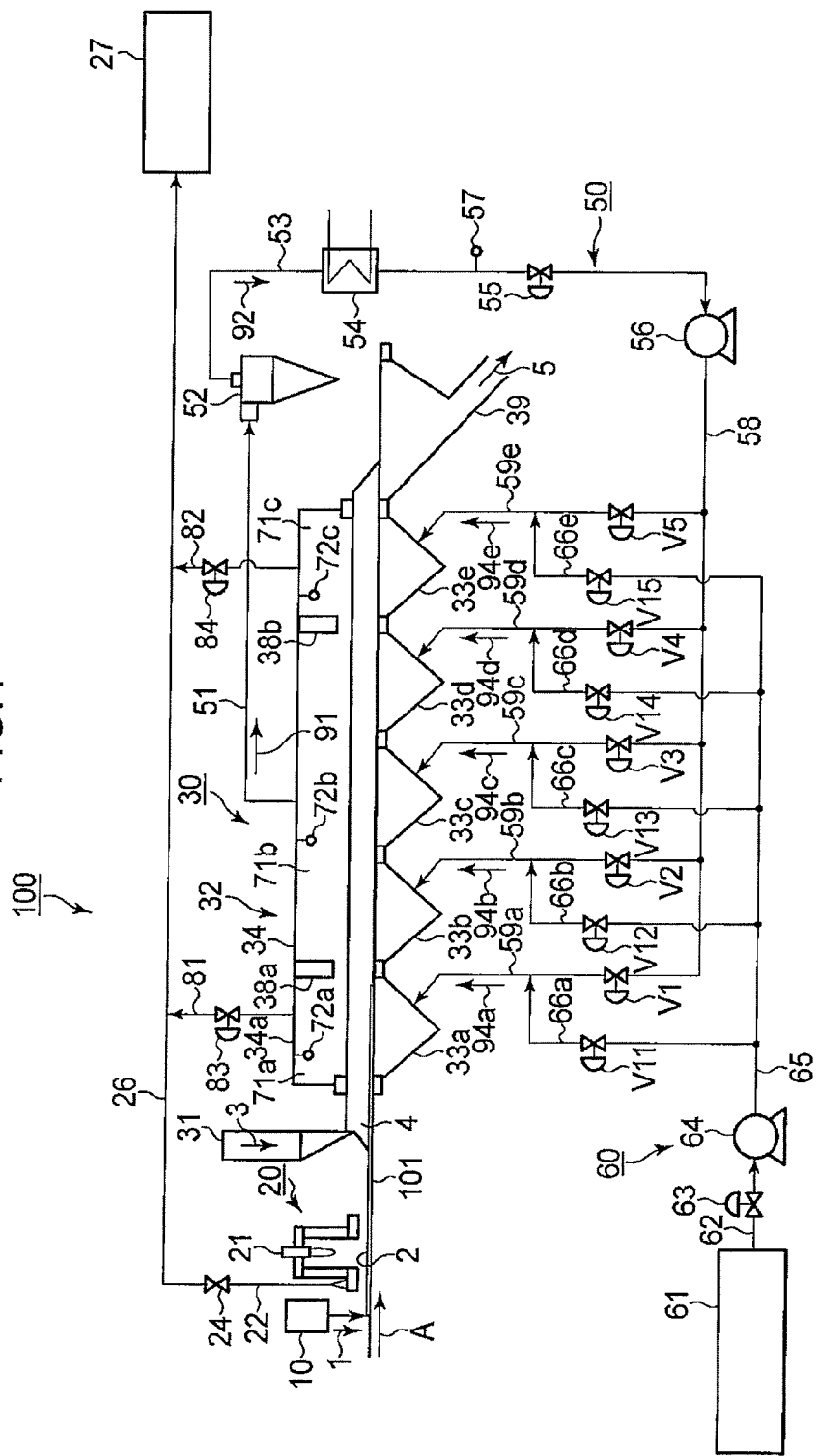
FIG. 1 is a schematic diagram showing an embodiment of a partially-reduced iron producing apparatus of the present invention.
Figure 2:
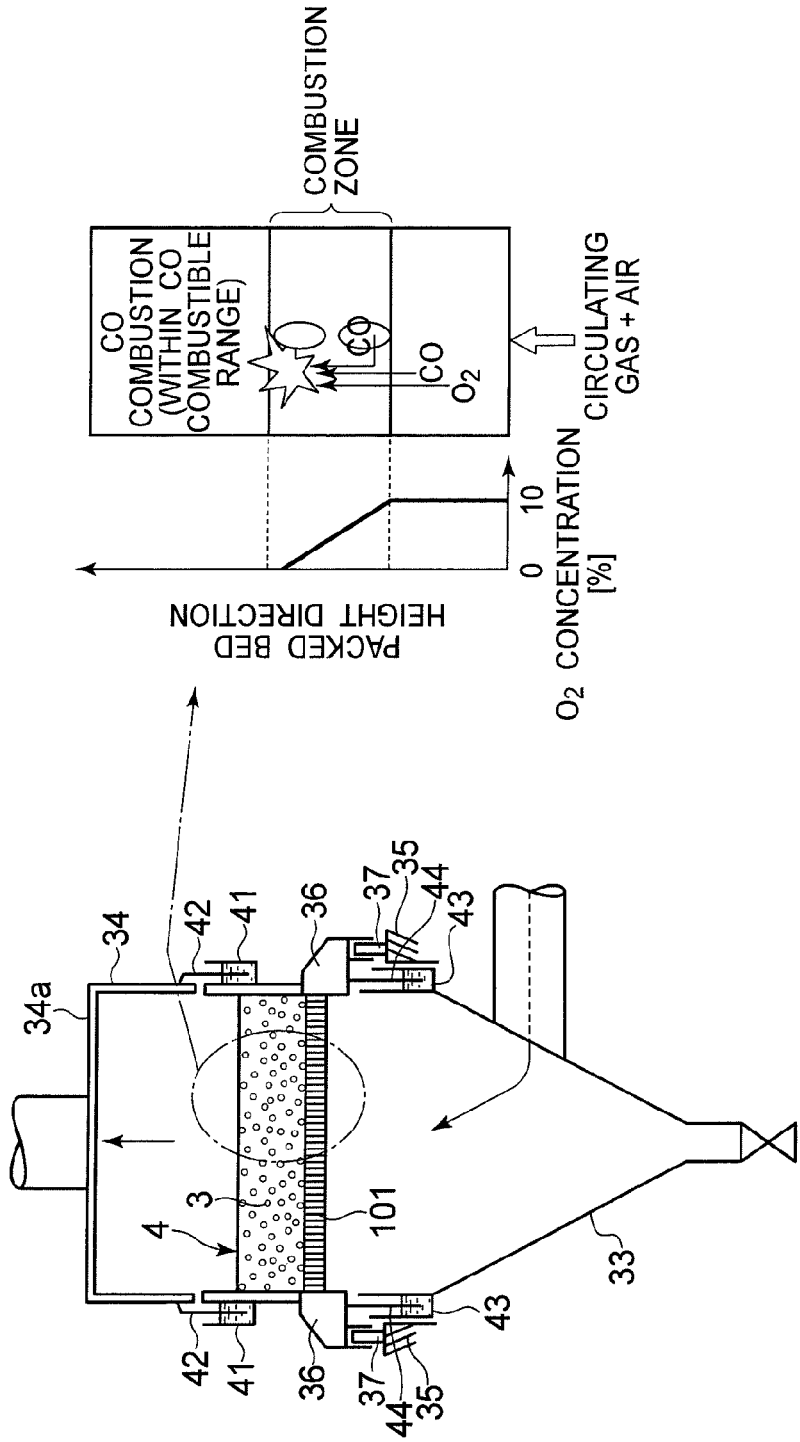
FIGS. 2A and 2B are explanatory diagrams of the embodiment of the partially-reduced iron producing apparatus of the present invention.

One embodiment of the partially-reduced iron producing method and the partially-reduced iron producing apparatus of the present invention is described with reference to FIGS. 1 to 3. In FIG. 1, the arrow A shows a travelling direction of a grate.

As shown in FIGS. 1, 2A, and 2B, the partially-reduced iron producing apparatus of the present invention includes a grate reduction furnace 100 of an upward suction type. The grate reduction furnace 100 includes an ignition coal supplying device 10, a combustion device 20, and a reduction furnace (partial reduction furnace) 30. These components are arranged from upstream in the travelling direction of a grate (endless grate) 101 in the order of description.

The ignition coal supplying device 10 is a device which supplies an ignition coal (ignition carbon material) 1 onto the grate 101 and lays the ignition coal 1 at a predetermined height. The ignition coal 1 is a material which can heat aftermentioned raw-material pellets 3 packed on an ignition coal layer 2 obtained by laying the ignition coal 1 and thereby cause a flammable volatile component to be generated from a carbon material for reproduction in the raw-material pellets 3. Solid coal (coke) and the like can be given as an example of the ignition coal 1. The laying height of the ignition coal 1 is such a height that the after-mentioned raw-material pellets 3 packed on the ignition coal layer 2 can be ignited, and is, for example, higher than 3 mm and lower than 10 mm, preferably 5 mm or more and 7 mm or less. When the bed height of the ignition coal layer 2 is equal to or below 3 mm, the amount of heat generated by the combustion of the ignited ignition coal 1 is so small as to be insufficient for generation of the flammable volatile component from the reduction carbon material in the raw-material pellets 3. Meanwhile, when the bed height is 10 mm or greater, the ignition coal layer 2 keeps combusting. Since this combustion consumes oxygen, supply of oxygen to the raw-material pellets 3 above the ignition coal layer 2 becomes insufficient. Moreover, the combustion of the ignition coal layer 2 keeps the temperature of the raw-material pellets 3 high for such a long period that cooling of the raw-material pellets 3 after combustion of a carbon monoxide gas, which will be described in detail later, is delayed, which makes reoxidation likely to occur.

The combustion device 20 includes a combustion burner 21 which ignites the ignition coal layer 2 (ignition coal 1) supplied onto the grate 101. In other words, the combustion device 20 forms igniting means. The combustion device 20 further includes a combustion gas exhaust pipe 22. The combustion gas exhaust pipe 22 is provided with a valve 24. The combustion gas exhaust pipe 22 is connected to an exhaust manifold 26 and a rear end portion of the exhaust manifold 26 is connected to a dust collector 27. Accordingly, a combustion gas generated when the ignition coal layer 2 is heated by the combustion burner 21 is exhausted to the outside of a system through the combustion gas exhaust pipe 22, the exhaust manifold 26, and the dust collector 27.

The reduction furnace 30 is a device which produces an agglomerate-like partially-reduced iron 5 by reducing the raw-material pellets 3 and has an annular shape as a whole. The reduction furnace 30 includes a raw-material pellet supplying device 31, a reduction furnace main body 32, and a partially-reduced iron discharging device 39 which are arranged in this order from upstream in the travelling direction of the grate 101. The raw-material pellet supplying device 31 (feed hopper) 31 is a device which supplies the raw-material pellets 3 onto the ignition coal layer 2. The raw-material pellet supplying device 31 not only supplies the raw-material pellets 3 onto the ignition coal layer 2, but also adjusts the height of a packed bed 4 of the raw-material pellets, which is formed by packing the raw-material pellets 3, to be a predetermined height. The raw-material pellets 3 are a raw material for the partially-reduced iron to be eventually produced and are formed by mixing and pelletizing a raw material containing iron oxides, the reduction carbon material, and a lime-based slag-forming flux and then coating the resultant object with an anti-oxidant. For example, the raw-material pellets 3 each contain coal by about 20% of its total amount and the amount of the flammable volatile component in the coal is 30% or more.

The reduction furnace main body 32 described above includes a wind box 33, an annular hood 34, and tracks 35, 35. The wind box 33 is installed below the grate 101 and is a fixed structure. The hood 34 is installed above the wind box 33 with the grate 101 interposed therebetween and is a fixed structure. The tracks 35, are laid in an annular shape on both sides of the wind box 33.

The aforementioned wind box 33 is formed of a first wind box 33a, a second wind box 33b, a third wind box 33c, a fourth wind box 33d, and a fifth wind box 33e which are arranged in this order from a side close to the raw-material pellet supplying device 31 in the travelling direction of the grate 101.

Two partition boards 38a and 38b are provided on a ceiling plate 34a of the aforementioned hood 34 and three regions 71a, 71b, and 71d are thus defined in the travelling direction A of the grate 101. The first partition board 38a is disposed at such a position as to define a space (ignition carbon material combustion region 71a to be described later) above the first wind box 33a and a space (raw-material pellet heating region 71b to be described later) above the second wind box 33b. The second partition board 38b is disposed at such a position as to define a space (raw-material pellet heating region 71b to be described later) above the fourth wind box 33d and a space (raw-material pellet cooling region 71c to be described later) above the fifth wind box 33e. Temperature sensors 72a, 72b, and 72c are provided respectively in the ignition carbon material combustion region 71a, the raw-material pellet heating region 71b, and the raw-material pellet cooling region 71c.

The grate 101 is porous and is configured such that a gaseous body can pass therethrough in a vertical direction but the ignition coal 1 and the raw-material pellets 3 cannot. The grate 101 is divided into multiple units and the annular grate 101 is formed by arranging these units in a circumferential direction. Each of the divided units is tiltably attached to annular support portions 36, 36 provided respectively on both sides of the grate 101. The support portions 36, 36 are provided with rollers 37, 37 travelling on the tracks 35, 35. Causing the rollers 37, 37 to travel on the tracks 35, 35 allows the grate 101 to horizontally circulate in a space between the wind box 33 and the hood 34.

Water seal boxes 41, 41 filled with water are annularly provided in upper portions of the support portions 36, 36 of the grate 101, along the entire peripheries thereof. Seal plates 42, 42 extending downward are annularly provided in lower portions of the hood 34 on both sides, along the entire peripheries thereof. Lower end portions of the seal plates 42, 42 are submerged in a liquid in the water seal boxes 41, 41. Hence, spaces between the support portions 36, 36 of the grate 101 and the lower portions of the hood 34 on both sides are sealed in an air-tight manner. In other words, the water seal boxes 41 and the seal plates 42 form a water seal device above the grate.

Meanwhile, water seal boxes 43, 43 filled with water are annularly provided in upper portions of the wind box 33 on both sides, along the entire peripheries thereof. Seal plates 44, 44 extending downward are annularly provided in lower portions of the support portions 36, 36 of the grate 101, along the entire peripheries thereof. Lower end portions of the seal plates 44, 44 are submerged in a liquid in the water seal boxes 43, 43. Hence, spaces between the support portions 36, 36 of the grate 101 and the upper portions of the wind box 33 on both sides are sealed in an air-tight manner. In other words, the water seal boxes 43 and the seal plates 44 form a water seal device below the grate.

An ignition carbon material combustion region gas exhaust pipe 81 is provided to communicate with the hood 34 forming the ignition carbon material combustion region 71a and a raw-material pellet cooling region gas exhaust pipe 82 is provided to communicate with the hood 34 forming the raw-material pellet cooling region 71c. The ignition carbon material combustion region gas exhaust pipe 81 communicates with the aforementioned exhaust manifold 26. A flow rate adjustment valve 83 is provided in the ignition carbon material combustion region gas exhaust pipe 81 and thereby the discharge amount of gas in the ignition carbon material combustion region can be adjusted. The raw-material pellet cooling region gas exhaust pipe 82 also communicates with the aforementioned exhaust manifold 26. A flow rate adjustment valve 84 is provided in the raw-material pellet cooling region gas exhaust pipe 82 and thereby the discharge amount of gas in the raw-material pellet cooling region can be adjusted.

The aforementioned reduction furnace 30 further includes an exhaust gas circulation device (exhaust gas circulation means) 50 which circulates an exhaust gas 91 by discharging the exhaust gas 91 from the raw-material pellet heating region 71b surrounded by the grate 101 and the hood 34 and supplying the exhaust gas 91 to the wind boxes 33a to 33e. The exhaust gas circulation device 50 includes a raw-material pellet heating region gas delivery pipe 51, a dust remover 52, a dust-removed gas delivery pipe 53, a gas cooler 54, a flow rate adjustment valve 55, a pump 56, a circulating gas delivery pipe 58, and first to fifth branch circulating gas delivery pipes 59a to 59e.

One end portion of the raw-material pellet heating region gas delivery pipe 51 communicates with the hood 34 forming the raw-material pellet heating region 71b and the other end portion thereof is connected to the dust remover 52. With this configuration, the exhaust gas 91 in the raw-material pellet heating region 71b is delivered to the dust remover 52 through the raw-material pellet heating region gas delivery pipe 51 and solid contents such as dust in the exhaust gas 91 is removed by the dust remover 52. One end portion of the dust-removed gas delivery pipe 53 is connected to the dust remover 52 and the other end portion thereof is connected to the pump 56. The dust-removed gas delivery pipe 53 is provided with the gas cooler 54 and the flow rate adjustment valve 55 in this order from a side close to the dust remover 52. With this configuration, an exhaust gas 92 (dust-removed gas) from which dust is removed has a temperature adjusted to a predetermined temperature by the gas cooler 54 and a flow rate adjusted by the flow rate adjustment valve 55, and is then fed by the pump 56. An $O_2$ sensor 57 which measures the oxygen concentration in the dust-removed gas 92 is provided in the dust-removed gas delivery pipe 53 at a position between the gas cooler 54 and the flow rate adjustment valve 55. One end portion of the circulating gas delivery pipe 58 is connected to the pump 56 and the other end portion branches into the first to fifth branch circulating gas delivery pipes 59a to 59e. The first to fifth branch circulating gas delivery pipes 59a to 59e communicate respectively with the first to fifth wind boxes 33a to 33e. The first to fifth branch circulating gas delivery pipes 59a to 59e are respectively provided with flow rate adjustment valves V1 to V5.

The aforementioned reduction furnace main body 32 further includes an air supplying device 60 forming air supply means which is connected to the first to fifth branch circulating gas delivery pipes 59a to 59e of the aforementioned exhaust gas circulation device 50 and supplies air to the first to fifth branch circulating gas delivery pipes 59a to 59e. The air supplying device 60 includes an air supplying source 61, an air feed pipe 62, a pump 64, and an air delivery pipe 65. One end portion of the air feed pipe 62 is connected to the air supplying source 61 and the other end portion thereof is connected to the pump 64. One end portion of the air delivery pipe 65 is connected to the pump 64 and the other end portion thereof branches into first to fifth branch air delivery pipes 66a to 66e communicating respectively with the first to fifth branch circulating gas delivery pipes 59a to 59e. The first to fifth branch air delivery pipes 66a to 66e are provided respectively with flow rate adjustment valves V11 to V15 forming flow rate adjustment means for adjusting the flow rate of air.

With the above configuration, gases (oxygen-containing gases) 94a to 94e containing oxygen and carbon monoxide whose concentrations are adjusted to desired levels can be supplied to the wind boxes 33a to 33e, respectively, by adjusting the opening degree of each of the flow rate adjustment valves V1 to V5 and the flow rate adjustment valves V11 to V15 based on the oxygen concentration measured by the $O_2$ sensor 57 and the temperatures measured by the temperature sensors 72a to 72c. In other words, the oxygen concentration can be adjusted to the desired levels in each of the ignition carbon material combustion region 71a, the raw-material pellet heating region 71b, and the raw-material pellet cooling region 71c.

The partially-reduced iron discharging device 39 is a device which discharges, from the grate 101, the partially-reduced iron 5 having been produced while passing through the regions 71a to 71c described above.

Descriptions are given of a procedure of producing the partially-reduced iron by using the partially-reduced-iron producing apparatus having the aforementioned configuration.

First, the ignition coal supplying device 10 supplies the ignition coal 1 onto the grate 101. At this time, the ignition coal layer 2 has its height adjusted within a range of 5 mm to 7 mm, for example. Then, the grate 101 moves forward and the burner 21 ignites the ignition coal layer 2 at about 800° C. Next, the grate 101 moves forward and the raw-material pellet supplying device 31 supplies the raw-material pellets 3 onto the ignition coal layer 2. The raw-material pellet packed bed 4 made of the raw-material pellets 3 has its height adjusted to about 200 mm, for example. Subsequently, the grate 101 moves forward and mixed gases of the circulated gas and air are vented into the hood 34. The mixed gas 94a whose oxygen concentration is adjusted to 15% is vented to the first wind box 33a. This causes the ignited ignition coal layer 2 to combust in the ignition carbon material combustion region 71a. The raw-material pellet packed bed 4 on the ignition coal layer 2 is heated by the heat of this combustion and a portion of the raw-material pellet packed bed 4 which is close to the ignition coal layer 2 is thereby heated. Note that an atmosphere temperature is adjusted to about 1100° C. in the ignition carbon material combustion region 71*a*.

The grate 101 further moves forward and the mixed gases 94*b* to 94*d* whose oxygen concentrations are adjusted to 11% are vented to the second to fourth wind boxes 33*b* to 33*d*. Due to this, the following phenomena occur in the raw-material pellet packed bed 4, which is heated by the ignition coal layer 2, in the raw-material pellet heating region 71*b* above the second to fourth wind boxes 33*b* to 33*d*. The flammable volatile component is generated from the reduction carbon material in the raw-material pellets 3 and about 75% to 90% of the flammable volatile component is combusted. This combustion of the flammable volatile component further increases the temperature of the raw-material pellets 3 and the reductive reaction proceeds. Thus, a carbon monoxide gas is generated and a part of the generated gas is combusted. As a result, high concentration of carbon monoxide, which is about 8%, for example, is generated in a center portion of the inside of the hood 34 in the grate travelling direction. Meanwhile, this combustion heats the raw-material pellets 3 adjacent thereto and the flammable volatile component is generated from the reduction carbon material in the adjacent raw-material pellets 3. The mixed gases 94*b* to 94*d* (oxygen containing gas), which are made by circulating remaining portion of the flammable volatile component and the carbon monoxide gas and mixing them with air, are supplied to the raw-material pellets 3 whose temperature has increased. As shown in FIG. 2B, this causes the carbon monoxide gas in the mixed gases 94*b* to 94*d* to be added to the carbon monoxide gas generated due to the reduction. As a result, the concentration of the carbon monoxide gas near the raw-material pellets 3 is increased to a level within the combustion range (12% or more) of the carbon monoxide gas and about 50% to 60% of the entire carbon monoxide gas combusts, thereby increasing the temperature. This creates a combustion zone of a temperature required for the reduction of partially-reduced iron. In other words, the reduction proceeds by causing carbon in the reduction carbon material in the raw-material pellets 3 to turn into gas and generate carbon monoxide and then causing the thus-generated carbon monoxide to bond with oxygen in the raw material containing iron oxides. The gas 91 in the raw-material pellet heating region 71*b* such as carbon monoxide and the remaining portion of the flammable volatile component which have not used for the combustion flows through the raw-material pellet heating region gas delivery pipe 51, has solid objects such as powdery objects therein removed by the dust remover 52, cooled to the predetermined temperature by the gas cooler 54, and is fed to the wind boxes 33*a* to 33*e* via the pump 56 and the first to fifth branch circulating gas delivery pipes 59*a* to 59*e*. Note that the atmosphere temperature is adjusted to about 1300° C. in the raw-material pellet heating region 71*b*.

Figure 3:
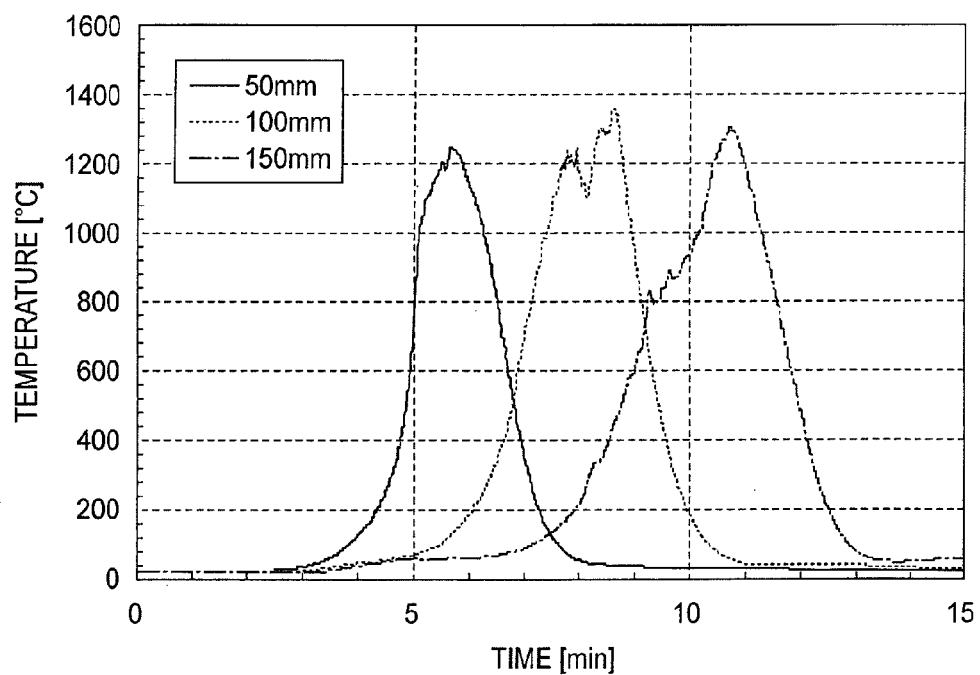
FIG. 3 is a graph showing an example of a temperature change from a bottom surface of the packed bed in a bed height direction thereof in the reduction furnace included in the embodiment of the partially-reduced iron producing apparatus of the present invention, observed when the raw-material pellets are packed at the height of 200 mm in the reduction furnace and are heated while the mixed gas is vented upward.

With reference to FIG. 3, descriptions are given of an example of a temperature change in a bed height direction of the packed bed of raw-material pellets from a bottom surface of the packed bed in the partially-reduced iron producing apparatus having the configuration described above, observed when the raw-material pellets are packed at the height of 200 mm in the reduction furnace and are heated while the mixed gas of the circulated gas and air is vented upward from the wind boxes below the raw-material pellets. In FIG. 3, the solid line shows a temperature history at a position away from the bottom surface of the packed bed by 50 mm, the dotted line shows a temperature history at a position away from the bottom surface of the packed bed by 100 mm, and the dot-dashed line shows a temperature history at a position away from the bottom surface of the packed bed by 150 mm. Note that the oxygen concentration in the first wind box is adjusted to 15% and the oxygen concentration in each of the second to fifth wind boxes is adjusted to 11%.

As shown in FIG. 3, it is found that temperatures which are equal to or above 1200° C. and which are equal to or below 1400° C. are obtained at all of the positions away from the bottom surface of the packed bed respectively by 50 mm, 100 mm, and 150 mm, i.e. across the entire layer height of the packed bed of the raw-material pellets. A temperature equal to or above 1200° C. is required for the reduction of the raw-material pellets and a temperature equal to or below 1400° C. prevents excessive melting.

The temperatures at the positions away from the bottom surface of the packed bed by 50 mm, 100 mm, and 150 mm reach their peaks sequentially along with the elapse of time. Hence, it is found that the combustion zone moves in the bed height direction of the packed bed of raw-material pellets. The raw-material pellets after the gas combustion are quickly cooled in few minutes from the peak temperature to a temperature equal to or below 500° C. at which reoxidation is less likely to occur.

Accordingly, in the raw-material pellet heating region 71*b* described above, the heating of the raw-material pellets 3, the generation and combustion of the flammable volatile component, the generation of carbon monoxide gas, the combustion of carbon monoxide gas by the circulation of the carbon monoxide gas and the remaining portion of the flammable volatile component, and the reduction reaction of iron oxides sequentially occur from the bottom surface of the raw-material pellet packed bed 4 to an upper layer thereof, while the grate 101 rotates between the position above the second wind box 33*b* and the position above the fourth wind box 33*d*.

Next, the grate 101 moves forward and the mixed gas 94*e* whose oxygen concentration is adjusted to be 5% or lower is vented to the fifth wind box 33*e*. This causes the raw-material pellet packed bed 4 whose reduction has proceeded to a predetermined degree to be cooled to about 100° C. to 800° C. in the raw-material pellet cooling region 71*c* above the fifth wind box 33*e* and the desired partially-reduced iron is produced. When the grate 101 further moves forward, the partially-reduced iron 5 is discharged from the partially-reduced iron discharging device 39.

By putting the partially-reduced iron produced in the procedure described above into a submerged arc furnace, in a hot state, together with a reduction carbon material to perform final reduction and melting, a steel material excellent in purity and processability can be produced at low cost.

In the partially-reduced iron producing apparatus of the embodiment, the carbon monoxide gas produced by reduction, which has been conventionally discharged in an exhaust gas and then emitted into the atmosphere or which has been conventionally combusted outside the system by using a supplemental fuel to recover exhaust heat therefrom with a boiler, is circulated through the packed bed of the raw-material pellets and then added to a carbon monoxide gas which is produced by the reduction. Thus, the carbon monoxide gas is combusted with the concentration thereof being increased, thereby improving the combustion rate. Moreover, the carbon monoxide gas is directly effectively used as a heat source in the packed bed of the raw material pellets. Hence, no carbon material for combustion, with which the conventional raw-material pellets are coated, is required. As a result, it is possible to reduce the consumption of carbon materials and to reduce carbon dioxide emissions. Furthermore, since the raw-material pellets are heated by the combustion of the gas generated by heating the raw-material pellets, the amount of generated gas is small. Hence, the combustion of carbon monoxide gas ends as soon as the concentration of carbon monoxide gas in the combustion zone of the packed bed of raw-material pellets falls below the combustion range of carbon monoxide, and the raw-material pellets 3 are thereby cooled. Thus, a time in which the raw-material pellets 3 are in contact with oxygen in a high temperature state is short, thereby reducing reoxidation. As a result, a partially-reduced iron with a high degree of metallization can be produced.

The amount of coal in the ignition coal layer 2 having the aforementioned coal layer height is about 2% of the total including the raw-material pellets. On the other hand, in the case of the conventional raw-material pellets coated with coal powder for combustion, the amount of coal in the coal powder for combustion is about 5% of the total. Accordingly, using the raw-material pellets coated with no ignition coal can reduce the usage amount of coal compared to that with the conventional method of producing reduced iron.

The partially-reduced iron producing apparatus of the embodiment includes: the partition boards 38a and 38b which are provided in the hood 34, which are surrounded by the hood 34 and the grate 101, and which define the space in the center portion in a longitudinal direction of the grate (region 71b); the exhaust gas circulation device 50 which discharges the exhaust gas in the region 71b and supplies the exhaust gas to the wind boxes 33b to 33d disposed to face the region 71b; the air supplying device 60 which is connected to the exhaust gas circulation device 50 and which supplies air; and the flow rate adjustment valves V12 to V14 which are provided in the air supplying device 60 and which adjust the flow rate of air. This configuration makes it possible to effectively use the carbon monoxide gas with relatively high concentration which is generated in the region 71b and to thereby suppress carbon dioxide emissions.

The descriptions have been given above by using the partially-reduced iron producing apparatus including the grate reduction furnace 100 of the up-draft type. However, the partially-reduced iron producing apparatus may include a grate reduction furnace of a down-draft type in which the raw-material pellet supplying device, the ignition carbon material supplying device, and the ignition device are arranged in this order from upstream in the travelling direction of the grate.

The descriptions have been given above of the partially-reduced iron producing apparatus including the grate reduction furnace 100 which circulates the exhaust gas discharged from the substantially center portion of the reduction furnace main body 32 in the travelling direction of the grate and sends the gas to the wind boxes. However, depending on the properties of the raw material, the partially-reduced iron producing apparatus may include a grate reduction furnace which circulates an exhaust gas discharged from a downstream end portion in the travelling of the grate and sends the gas to the wind boxes via the gas cooler.

{Industrial Applicability}

The partially-reduced iron producing method and the partially-reduced iron producing apparatus of the present invention enable reducing carbon dioxide emissions while suppressing the usage amount of carbon material for combustion, and can be thereby used effectively in steel industry.

{Reference Signs List}
1 IGNITION COAL
2 IGNITION COAL LAYER
3 RAW-MATERIAL PELLET
4 PACKED BED OF RAW-MATERIAL PELLETS
5 PARTIALLY-REDUCED IRON
10 IGNITION COAL SUPPLYING DEVICE
20 COMBUSTION DEVICE
21 COMBUSTION BURNER
22 EXHAUST PIPE
REDUCTION FURNACE
31 RAW-MATERIAL PELLET SUPPLYING DEVICE (FEED HOPPER)
32 REDUCTION FURNACE MAIN BODY
33a TO 33e WIND BOX
34 HOOD
35 TRACK
36 SUPPORT PORTION
37 ROLLER
38a, 38b PARTITION BOARD
41, 43 WATER SEAL BOX
42, 44 SEAL PLATE
51 RAW-MATERIAL PELLET HEATING REGION GAS DELIVERY PIPE
52 DUST REMOVER
53 DUST-REMOVED GAS DELIVERY PIPE
54 GAS COOLER
55 FLOW RATE ADJUSTMENT VALVE
56 PUMP
57 $O_2$ SENSOR
58 CIRCULATING GAS DELIVERY PIPE
59a TO 59e FIRST TO FIFTH BRANCH CIRCULATING GAS DELIVERY PIPES
60 AIR SUPPLYING DEVICE
61 AIR SUPPLYING SOURCE
62 AIR FEED PIPE
63 FLOW RATE ADJUSTMENT VALVE
64 PUMP
65 AIR DELIVERY PIPE
66a TO 66e FIRST TO FIFTH BRANCH AIR DELIVERY PIPES
71a IGNITION CARBON MATERIAL COMBUSTION REGION
71b RAW-MATERIAL PELLET HEATING REGION
71c RAW-MATERIAL PELLET COOLING REGION
81 IGNITION CARBON MATERIAL COMBUSTION REGION GAS EXHAUST PIPE
82 RAW-MATERIAL PELLET COOLING REGION GAS EXHAUST PIPE
83, 84 FLOW RATE ADJUSTMENT VALVE
100 GRATE REDUCTION FURNACE
101 ENDLESS GRATE

The invention claimed is:

1. A partially-reduced iron producing method comprising the steps of:
  laying an ignition carbon material to a predetermined height on an endless grate;
  igniting the ignition carbon material, and then packing raw-material pellets on the ignited ignition carbon material, the raw-material pellets formed by mixing and pelletizing a reduction carbon material and a raw material containing iron oxides;
  causing a flammable volatile component to be generated from the reduction carbon material in the raw-material pellets and combust, by use of a combustion heat of the ignited ignition carbon material;
  causing a temperature of the raw-material pellets to further rise by use of a combustion heat of the flammable volatile component, so that a reduction reaction proceeds and a carbon monoxide gas is generated, while causing the raw-material pellets adjacent thereto to be heated by use of the combustion heat, so that a flammable volatile component is generated from the reduction carbon material in the adjacent portions of the raw-material pellets;

increasing a concentration of the carbon monoxide gas near the raw-material pellets having the temperature further raised, to a combustion range of the carbon monoxide gas by supplying an oxygen-containing gas to the raw-material pellets having the temperature thereof caused to further rise, so that the carbon monoxide gas combusts and a combustion zone is formed, the oxygen-containing gas made by circulating a remaining portion of the flammable volatile component and the carbon monoxide gas and mixing the remaining portion and the gas with air; and moving the combustion zone sequentially in a bed height direction of a packed bed of the raw-material pellets in a period between supplying of the raw-material pellets onto the ignition carbon material and discharging thereof, so that the packed bed of the raw-material pellet is thermally reduced and a partially-reduced iron is produced.

2. The partially-reduced iron producing method according to claim 1, wherein a laying height of the ignition carbon material is higher than 3 mm but is lower than 10 mm.

3. The partially-reduced iron producing method according to claim 1, wherein the partially-reduced iron thus produced is put into a submerged arc furnace in a state while being thermally reduced together with a reduction carbon material to be subjected to final reduction and melting.

4. A partially-reduced iron producing apparatus comprising a partial reduction furnace configured to pack, on an endless grate, raw-material pellets formed by mixing and pelletizing a reduction carbon material and a raw material containing iron oxides and to thermally reduce the raw-material pellets, the partial reduction furnace including:

ignition carbon material supply device configured to lay an ignition carbon material layer to a predetermined height on the endless grate;

ignition device configured to the ignite the ignition carbon material layer;

raw-material pallet supply device configured to pack the raw-material pellets on the ignition carbon material layer ignited by the ignition device; and exhaust gas circulation device configured to supply an oxygen-containing gas to the packed bed of the raw-material pellets heated by a combustion heat of the ignited ignition carbon material layer, the oxygen-containing gas made by circulating part of an exhaust gas discharged from the packed bed of the raw-material pellets and mixing the part with air, wherein a partially-reduced iron is produced by thermally reducing the packed bed of the raw-material pellets through a combustion region for the ignition carbon material layer and a heating region for the raw-material pellets, the combustion region formed on an upstream side in a travelling direction of the endless grate by supplying the oxygen-containing gas having a predetermined oxygen concentration to the ignition carbon material layer ignited by the ignition device, the heating region formed downstream of the combustion region for the ignition carbon material layer in the travelling direction of the endless grate by supplying the oxygen-containing gas having a lower oxygen concentration than the predetermined oxygen concentration to the packed bed of the raw-material pellets.

5. The partially-reduced iron producing apparatus according to claim 4, further comprising:

a hood provided above the endless grate and configured to form an air-tight space between the hood and the endless grate; and a plurality of wind boxes provided below the endless grate and configured to form air-tight spaces between the wind boxes and the endless grate, wherein the ignition carbon material supply device is disposed upstream of a raw-material pellet supply device in the travelling direction of the endless grate.

6. The partially-reduced iron producing apparatus according to claim 5, further comprising:

partition boards provided in the hood, surrounded by the hood and the endless grate, and configured to define a space in a center portion in a longitudinal direction of the endless grate;

exhaust gas circulation device configured to discharge an exhaust gas in the space in the center portion in the longitudinal direction of the endless grate and supplying the exhaust gas to the wind boxes;

air supply device, connected to the exhaust gas circulation means, configured to supply air; and flow rate adjustment device, provided in the air supply device, configured to adjust a flow rate of the air.

* * * * *